March 3, 1964  W. G. GORMAN  3,123,261
METERED AEROSOL VALVE
Filed March 29, 1961
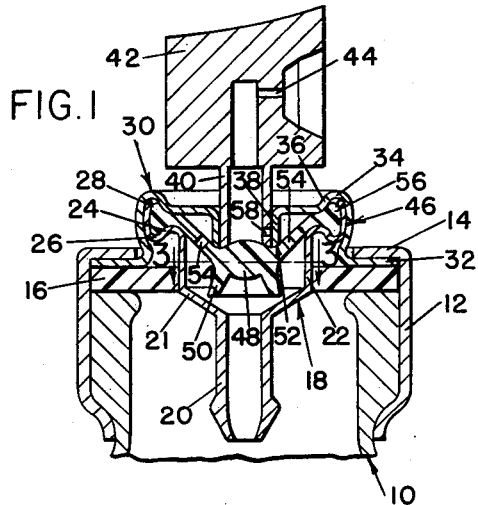
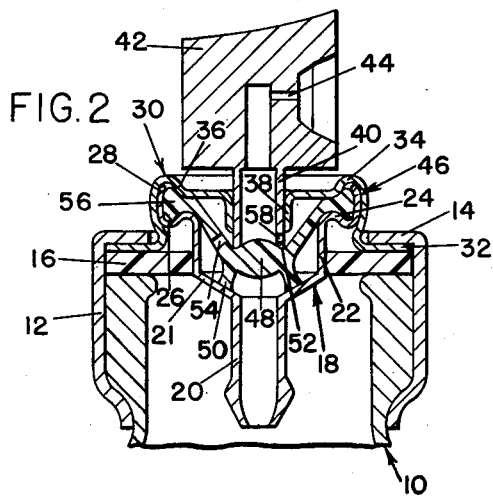
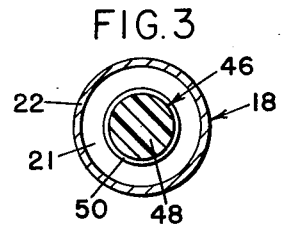
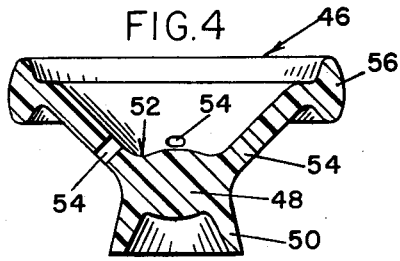
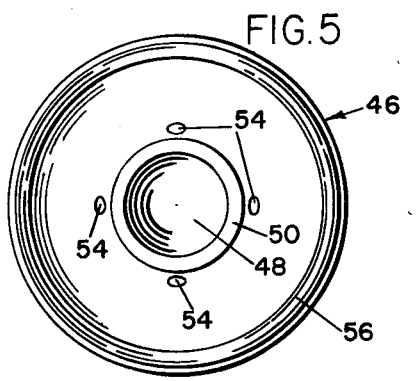
INVENTOR
WILLIAM G. GORMAN
by Charles R. Fay,
ATTORNEY United States Patent Office 3,123,261
Patented Mar. 3, 1964

3,123,261
METERED AEROSOL VALVE
William G. Gorman, Albany, N.Y., assignor to Sterling Drug Inc., New York, N.Y., a corporation of Delaware
Filed Mar. 29, 1961, Ser. No. 99,195
6 Claims. (Cl. 222—394)

This invention relates to a new and improved valve construction particularly of the type used for metering aerosol container charges so that when the valve is actuated by the user, a certain metered amount of material is expressed from the container.

There are many problems involved in devices of this nature and particularly with respect to sealing of the valve so that the pressure in the container will not cause leakage. These valve devices in general each comprise a ferrule which secures the valve to the container, a tank which is mounted in a body gasket and in cooperation with a sealing gasket and valve stem arrangement provides for metering of the charge and the use of the aerosol. Leakage is apt to occur past the sealing gasket which in some cases may be flexed by the valve stem for the operation, while in other cases the valve stem moves relatively to the sealing gasket which stays fixed. A balance must be maintained between sufficient sealing between the stem and gasket to prevent leakage while still allowing ease of operation of the valve stem or other actuator which may be used to provide the action required.

It is the principal object of the present invention to overcome the problems briefly outlined above; the provision of a new and improved valve for aerosols which includes in turn a new and improved sealing gasket; and the provision of a new and improved flexible sealing gasket which effectively seals the valve against leakage when not in operation but which yields to allow the metered charge to escape when actuated, and in addition also forms a seal with the tank so as to shut off communication between the interior of the container and the tank during the escape of the metered charge.

A still further object of the invention resides in the provision of a metering aerosol valve of the class described including a body gasket for the container of the material under pressure, a dome member associated therewith and held thereto as for instance by a ferrule, and there being an internal tank held in fixed relation in the container by the body gasket in combination with the dome, and including the new sealing gasket which is held in position by means of the dome and extends into cooperative relationship with the tank normally providing communication between the interior of the container and the tank to form a metering chamber, and normally seals the metering chamber from the actuator and escape port therein, but which when actuated seals the container from the metering chamber and allows escape of the material under pressure in said metering chamber through the exit port for proper dispersion thereof at the desired point.

Other objects and advantages of the invention will appear hereinafter.

Reference is to be had to the accompanying drawings, in which

FIG. 1 is a view in section illustrating the new valve applied to an aerosol container and in closed condition;

FIG. 2 is a similar view showing the open condition of the valve to obtain a charge of material;

FIG. 3 is a section on lines 3—3 of FIG. 1;

FIG. 4 is an enlarged section of the sealing gasket, and

FIG. 5 is a bottom plan view of the sealing gasket.

In the form of the invention illustrated herein, the reference numeral 10 indicates in general any kind of aerosol container to which is applied by any desired means well known in the art an annular ferrule 12 having an inwardly directed angular flange 14 which holds an annular body gasket 16 to the lip of the container 10.

The body gasket is provided with a relatively large central opening which receives and holds the tank generally indicated by the reference numeral 18. This tank has an inner reduced stem portion at 20 which is hollow and which is constantly in communication with the interior of the aerosol container 10. The stem 20 extends upwardly in a flaring or conical form at 21 which merges into a relatively enlarged portion 22 embraced by the body gasket 16 holding the tank in position. The enlarged portion at 22 is also hollow and in free communication as thus far described with relation to the interior of the aerosol container 10.

The enlarged portion 22 of the tank extends upwardly above the body gasket 16 and turns outwardly, down, and then upwardly as indicated at 24 forming an annular shoulder which is depressed adjacent its outermost peripheral portion as at 26. This tank member then terminates at the generally circular edge 28.

There is a dome member which is generally indicated at 30 and this dome member essentially is an extension of the ferrule. The dome member 30 is provided with an outwardly directed flange 32 interposed between flange 14 and the body gasket, holding the dome in position. The dome then extends inwardly and upwardly to the highest point thereof at 34, this being also annular in shape. From there the dome extends inwardly and turns downwardly accommodating the rim at 28 of the tank 18 and providing a depressed inwardly directed holding groove complementary to the portion at 26 of the tank. The dome then extends generally inwardly as at 36 and again downwardly as at 38 to provide a guide and holding means for a hollow stem portion 40 of an actuator head 42 having an interior chamber communicating with an orifice at 44 for the emission of the spray.

The sealing gasket is made of a strong, resilient, and flexible rubber or plastic, and is generally indicated by the reference numeral 46 and it has a central domed relatively thick solid portion 48 providing a base for a depending flaring or conical skirt 50 and it provides at its upper surface an annular depression at 52 which accommodates the lower edge of the downward extension 38 of the dome. The sealing gasket then extends upwardly in flaring inverted cone shape, having a hole or holes 54, and terminates in an enlarged rim at 56. This enlarged rim is firmly held by the tank and dome, as between the parts thereof at 26 as to the tank and 34 as to the dome respectively. With the parts at rest, as in FIG. 1, the bottom edge of the skirt 50 of the sealing gasket is out of contact with the portion 21 of the tank. The lower portion of the stem 40 is clearly housed within the downwardly turned guide portion 38 of the dome 30, thus closing the exit port 58 in the hollow stem 40.

With the parts in this position (FIG. 1), it will be seen that there is communication between the interior of the aerosol container 10 and the space between the sealing gasket 46 and the tank, and that the holes 54 in the sealing gasket also allow communication with the space between the part of the dome at 36 and the sealing gasket. At the same time of course the exit port 58 is clearly closed. However, if the head 52 be moved downwardly stretching the sealing gasket to a point where the exit port 58 in the stem 40 becomes exposed to the area between the sealing gasket and the dome, then there will be instant communication between the metering chamber, i.e., between the tank and the sealing gasket and the dome and the sealing gasket, and thus the charge which has been trapped and measured in these metering spaces goes into stem 40 through exit port 58 up into the actuator and out through the orifice 44.

Before this has happened, however, the lower edge of the skirt 50 has impinged upon the conical portion 21 of the tank 18, see FIG. 2. This action will cause the skirt to be spread slightly and in any event to be very firmly held against the conical portion of the tank, thus completely sealing off the material of the aerosol container with respect to any portion of the device forming the metering chamber. This forms a completely sealed closure which is maintained until such time as the head 42 is released, whereupon the sealing gasket itself forces the stem back to the original closed position of the exit port 58 as seen in FIG. 1. It is pointed out that the skirt portion 50 of the sealing gasket seals with tank 18 prior to the uncovering of port 58 and it maintains this sealing connection until after exit port 58 has once more been closed off by the resiliency of the sealing gasket in raising the stem 40 to its original FIG. 1 position.

Having thus described by invention and the advantages thereof, I do not wish to be limited to the details herein disclosed, otherwise than as set forth in the claims, but what I claim is:

1. A metering valve construction for controlling the discharge of fluid material under pressure from a container, said valve construction comprising a ferrule, a hollow actuator stem, means to movably support said actuator stem, a tank, said tank including a wall having a passage therethrough for communication between the tank and the container, an external body gasket for said tank, a sealing gasket in the tank, said ferrule including means holding the tank and body gasket in position, means holding the sealing gasket in position to be impinged upon by said actuator stem, said sealing gasket being resilient and stretchable and located between the inner end of the actuator stem and the said tank wall, said tank wall and sealing gasket providing a metering chamber therebetween, said metering chamber being normally open to the tank passage, means on said sealing gasket for contact with the said tank wall sealing off the tank passage to the container and thereby closing the metering chamber with respect to said container upon inward motion of said actuator stem, said actuator stem having a port normally closed by the actuator stem supporting means but having a position wherein it is open to said metering chamber for discharge of the material in said metering chamber upon stretching action of the sealing gasket under influence of the actuator stem, the resiliency of the sealing gasket normally holding the actuator stem in outward position with its inlet closed.

2. A metering valve construction as recited in claim 1 wherein the tank passage sealing means on the sealing gasket comprises a depending skirt having a rim normally spaced from the tank but contacting the tank and sealing the tank passage in closed condition of the metering chamber.

3. A metering valve construction for controlling the discharge of fluid material under pressure from a container, said valve construction comprising a ferrule, a hollow valve actuator having an inlet and an exit for said material, means to movably support said valve actuator with respect to said ferrules, a tank, said tank including a wall having a passage for communication between the tank and the container, a body gasket for said tank holding the same in position with respect to said container, and a sealing gasket in the tank, said ferrule including means holding the tank and body gasket in position and holding the sealing gasket adjacent its edges in position to be impinged upon centrally by said actuator, said sealing gasket being resilient and distortable by the actuator, said sealing gasket being located between the actuator and the tank wall, said tank wall and said sealing gasket providing a metering chamber therebetween, said metering chamber being normally open to the container, means at one side of said sealing gasket for contact with the said tank wall sealing off the tank passage to the container and thereby closing the metering chamber with respect to said container upon motion of said actuator in a predetermined direction, the inlet for said actuator being normally closed but having a position of coincidence with said metering chamber for discharge of the material in said metering chamber through the actuator to the exit thereof upon distortion of the sealing gasket to closed position of the metering chamber under influence of the actuator in its motion in said predetermined direction, the resiliency of the sealing valve normally holding the actuator in a position to maintain the inlet closed.

4. A metering valve construction for aerosols including means to connect the valve construction to the mouth of the aerosol container, said valve construction comprising a tank, means to hold and seal the tank in the mouth of the container, a movable valve actuator, a sealing gasket, means to mount the actuator in operative position relative to the sealing gasket, said sealing gasket being in a depending dished form and having a generally central portion thereof impinged upon by the inner end of said valve actuator, said sealing gasket being stretchable, an inlet in said actuator normally held in closed position relative to the actuator mounting means, said sealing gasket yielding under influence of the actuator to position said inlet inwardly beyond the actuator mounting means to uncover the inlet, said tank and said sealing gasket forming a metering chamber therebetween and having a normally open passage to the container, and means on the sealing gasket forming a closure for said tank passage to seal off the aerosol container from the interior of the tank upon stretching of the sealing gasket under influence of an inward push on the actuator to open its inlet to the metering chamber in the tank, the means for closing the tank passage comprising a depending skirt on the sealing gasket.

5. The metering valve construction as recited in claim 4 wherein said sealing gasket is in the form of an inverted cone and the actuator is in the form of a tubular stem having an end bearing upon the cone at the inner central part thereof.

6. The metering valve construction as recited in claim 4 wherein said sealing gasket is in the form of an inverted cone and the actuator is in the form of a tubular stem having an end bearing upon the cone at the inner central part thereof, and the depending skirt on the sealing gasket is located at the outer part thereof.

References Cited in the file of this patent

UNITED STATES PATENTS

| | | |
|---|---|---|
| 2,913,749 | Ayres | Nov. 24, 1959 |
| 2,968,427 | Meshberg | Jan. 17, 1961 |